(12) United States Patent
Okamoto et al.

(10) Patent No.: US 11,738,546 B2
(45) Date of Patent: *Aug. 29, 2023

(54) LAMINATE, BLISTER CONTAINER, AND PUSH-THROUGH PACKAGE

(71) Applicant: FUJIMORI KOGYO CO., LTD., Tokyo (JP)

(72) Inventors: Hajime Okamoto, Tokyo (JP); Kousuke Kashima, Tokyo (JP); Ai Ito, Tokyo (JP); Toyoaki Suzuki, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/493,759

(22) PCT Filed: Mar. 12, 2018

(86) PCT No.: PCT/IB2018/000230
§ 371 (c)(1),
(2) Date: Sep. 13, 2019

(87) PCT Pub. No.: WO2018/167556
PCT Pub. Date: Sep. 20, 2018

(65) Prior Publication Data
US 2020/0031105 A1    Jan. 30, 2020

(30) Foreign Application Priority Data

Mar. 17, 2017  (JP) .................. 2017-053665

(51) Int. Cl.
*B32B 27/30*     (2006.01)
*B32B 27/32*     (2006.01)
(Continued)

(52) U.S. Cl.
CPC .............. *B32B 27/30* (2013.01); *B32B 27/32* (2013.01); *B32B 2309/105* (2013.01);
(Continued)

(58) Field of Classification Search
None
See application file for complete search history.

(56) References Cited

U.S. PATENT DOCUMENTS

| 3,169,936 A | * | 2/1965 | Armour | ................. C09J 123/28 |
| | | | | 523/437 |
| 4,751,270 A | * | 6/1988 | Urawa | .................. C08F 255/02 |
| | | | | 525/244 |

(Continued)

FOREIGN PATENT DOCUMENTS

| CA | 2374869 A1 | 12/2000 |
| CN | 1222408 C | 10/2005 |

(Continued)

OTHER PUBLICATIONS

International Search Report dated Jun. 12, 2018 for PCT/IB2018/000230 and English translation; 5 pgs.

(Continued)

*Primary Examiner* — Frank J Vineis
*Assistant Examiner* — Nicole T Gugliotta
(74) *Attorney, Agent, or Firm* — Hauptman Ham, LLP

(57) ABSTRACT

A laminate has a substrate layer, an intermediate layer, and a fluorine-based resin layer in this order, and has a total film thickness of 400 μm or less, in which a thickness of the fluorine-based resin layer is 20 μm or more and 150 μm or less and a water vapor permeability of the laminate is 0.5 $g/m^2/24$ hours or less.

7 Claims, 1 Drawing Sheet

(51) Int. Cl.
  *B65D 65/40*     (2006.01)
  *B65D 75/32*     (2006.01)
  *B32B 27/36*     (2006.01)
  *B32B 27/08*     (2006.01)
(52) U.S. Cl.
  CPC .......... *B32B 2327/12* (2013.01); *B65D 65/40* (2013.01); *B65D 75/32* (2013.01)

(56) References Cited

U.S. PATENT DOCUMENTS

| | | | |
|---|---|---|---|
| 5,874,035 | A | 2/1999 | Tsai et al. |
| 6,555,190 | B1* | 4/2003 | Tsai .................. B32B 27/36 |
| | | | 428/36.6 |
| 6,632,518 | B1 | 10/2003 | Schmidt et al. |
| 6,887,334 | B2 | 5/2005 | Cherpinsky et al. |
| 8,541,073 | B2 | 9/2013 | Kendig et al. |
| 11,220,390 | B2 | 1/2022 | Okamoto et al. |
| 11,261,354 | B2 | 3/2022 | Kashima et al. |
| 2003/0008152 | A1 | 1/2003 | Tsai et al. |
| 2006/0014022 | A1 | 1/2006 | Kendig et al. |
| 2010/0051861 | A1 | 3/2010 | Inubushi et al. |
| 2011/0210037 | A1 | 9/2011 | Muenster et al. |
| 2011/0319571 | A1* | 12/2011 | Botros ............... C09J 123/0815 |
| | | | 525/333.7 |
| 2015/0125676 | A1 | 5/2015 | Mizutani |
| 2016/0068717 | A1 | 3/2016 | Gasa et al. |
| 2019/0367245 | A1 | 12/2019 | Okamoto et al. |

FOREIGN PATENT DOCUMENTS

| | | |
|---|---|---|
| CN | 101052676 A | 10/2007 |
| EP | 3575088 A1 | 12/2019 |
| JP | H6504742 A | 6/1994 |
| JP | 2000103914 A | 4/2000 |
| JP | 2002527556 A | 8/2002 |
| JP | 2004-501799 A | 1/2004 |
| JP | 2006517880 A | 8/2006 |
| JP | 2008-507597 A | 3/2008 |
| JP | 2012117068 A | 6/2012 |
| JP | 2012-135980 A | 7/2012 |
| JP | 2014-028508 A | 2/2014 |
| JP | 2014-218633 A | 11/2014 |
| JP | 2015117281 A | 6/2015 |
| JP | 2016526077 A | 9/2016 |
| JP | 2018095710 A | 6/2018 |
| JP | 2018118425 A | 8/2018 |
| WO | 1993003922 A1 | 3/1993 |
| WO | 1993006158 A1 | 4/1993 |
| WO | 1997048553 A1 | 12/1997 |
| WO | 2000073358 A1 | 12/2000 |
| WO | 2006063416 A1 | 6/2006 |
| WO | 2008032743 A1 | 3/2008 |
| WO | 2008148176 A1 | 12/2008 |
| WO | 2017031351 A1 | 2/2017 |

OTHER PUBLICATIONS

International Preliminary Report on Patentability dated Sep. 17, 2019 for PCT/IB2018/000230 and English translation thereof; 12 pgs.
Office Action in corresponding Indonesian Patent Application No. P00201909084 dated Jun. 21, 2021, 9 pgs.
Office Action in corresponding Chinese Patent Application No. 201880018656.2 dated Jul. 28, 2021, 11 pgs.
Office Action in corresponding Japanese Patent Application No. 2017-053665 dated Feb. 24, 2021 with English translation, 8 pgs.
Extended European Search Report in corresponding European Patent Application No. 18766896.7, dated Nov. 17, 2020, 7 pgs.
Office Action in corresponding Chinese Patent Application No. 201880018656.2, dated Jan. 18, 2021 with English summary, 5 pgs.
Office Action in corresponding Japanese Patent Application No. 2017-053665 dated Oct. 5, 2021; 6 pgs.
Office Action in corresponding Chinese Patent Application No. 201880018656.2 dated Nov. 22, 2021; 10 pgs.
Office Action for European Patent Application No. 18766896.7; dated Mar. 2, 2022; 4 pgs.
Office Action in corresponding Chinese Patent Application No. 201880018656.2 dated Apr. 6, 2022 with English Summary; 5 pgs.
Notice of Allowance for Japanese Patent Application No. 2021-213062 dated Nov. 1, 2022 and English translation thereof; 5 pgs.
Notice of Allowance for Japanese Patent Application No. 2021-213063 dated Nov. 1, 2022 and English translation thereof; 5 pgs.
Office Action in Corresponding European Patent Application No. 18766896.7, dated Mar. 28, 2023; 4 pgs.

* cited by examiner

LAMINATE, BLISTER CONTAINER, AND PUSH-THROUGH PACKAGE

CROSS REFERENCE TO RELATED APPLICATION

This application is a National Phase of PCT/IB2018/000230 filed on Mar. 12, 2018, which, in turn, claimed the priority of Japanese Patent Application No. 2017-053665 which was filed on Mar. 17, 2017.

TECHNICAL FIELD

The present invention relates to a laminate, a blister container, and a press-through package.

BACKGROUND TECHNOLOGY

A film laminate having high barrier properties is used in packaging materials for foods, medicines, and the like. In the pharmaceutical field, for individual packaging of tablets and capsules, a press-through package (hereinafter, may be referred to as "PTP") is used.

For suppressing deterioration of the content, a resin film that is a PTP forming material is required to have barrier properties to water vapor. Furthermore, generally, since PTP is manufactured by deep draw molding, a resin film that is a PTP forming material is required to have good moldability. For example, Patent Documents 1 and 2 describe a laminate in which a fluorine-based resin film is laminated in order to improve barrier properties to water vapor.

DOCUMENTS OF RELATED ART

Patent Documents

Patent Document 1: Japanese Unexamined Patent Application, First Publication No. 2014-028508
Patent Document 2: Japanese Unexamined Patent Application, First Publication No. 2012-135980

SUMMARY OF THE INVENTION

Problem to be Solved by the Invention

When a laminate having high barrier properties to water vapor is manufactured using a fluorine-based resin having high barrier properties, it is required to provide a laminate excellent in moldability in addition to high barrier properties.

The present invention has been made in view of the above-mentioned circumstances, and an object thereof is to provide a laminate excellent in moldability, as well as a blister container and a press-through package each including the laminate.

Means for Solving the Problem

That is, the present invention has adopted the following configurations.

[1] A laminate comprising a substrate layer, an intermediate layer, and a fluorine-based resin layer in this order, and having a total film thickness of 400 μm or less, wherein a thickness of the fluorine-based resin layer is 20 μm or more and 150 μm or less, and a water vapor permeability of the laminate is 0.5 g/m$^2$/24 hours or less.

[2] The laminate according to [1], further comprising a second intermediate layer and a second substrate layer in this order on a surface of the fluorine-based resin layer, the surface being opposite to a surface on which the intermediate layer is formed.

[3] The laminate according to [1] or [2], wherein the fluorine-based resin layer contains polychlorotrifluoroethylene.

[4] The laminate according to any one of [1] to [3], wherein an upper yield point stress of the laminate is 1,500 N/cm$^2$ or more.

[5] The laminate according to any one of [1] to [4], wherein the intermediate layer contains a polyethylene-based resin and a modified polyethylene-based resin.

[6] The laminate according to any one of [1] to [4], wherein the intermediate layer contains an acid-modified polyolefin resin, a resin containing an epoxy group, and an elastomer resin.

[7] The laminate according to any one of [2] to [6], wherein the second intermediate layer contains a polyethylene-based resin and a modified polyethylene-based resin.

[8] The laminate according to any one of [2] to [6], wherein the second intermediate layer contains an acid-modified polyolefin resin, a resin containing an epoxy group, and an elastomer resin.

[9] A blister container comprising the laminate according to any one of [1] to [8].

[10] A press-through package comprising the laminate according to any one of [1] to [8].

Effects of Invention

According to the present invention, there can be provided a laminate excellent in moldability, as well as a blister container and a press-through package each including the laminate.

BEST MODE FOR CARRYING OUT THE INVENTION

The present invention will be described below based on a preferable embodiment.

<Laminate>

First Embodiment

A first embodiment of the laminate of the present invention will be described with reference to FIG. 1.

Figure 1:
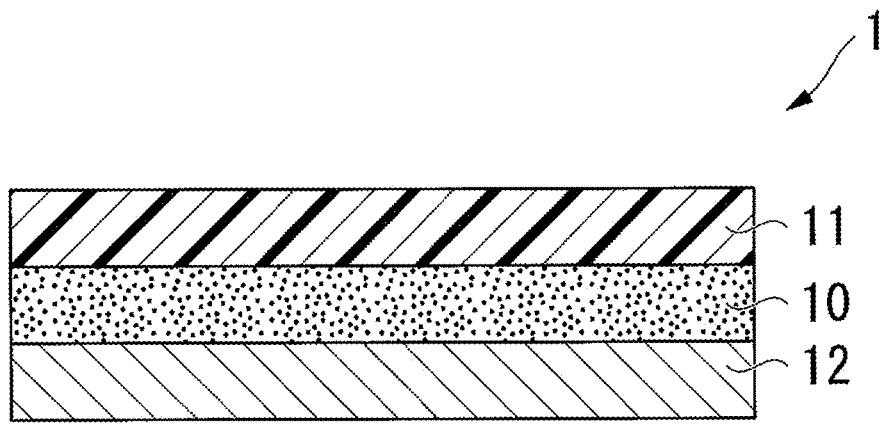
FIG. 1 is a schematic cross-sectional view of a laminate according to a first embodiment of the present invention.

In a laminate 1 of the present embodiment shown in FIG. 1, a substrate layer 12, an intermediate layer 10, and a fluorine-based resin layer 11 are laminated in this order. The intermediate layer 10 functions as an adhesive agent layer that bonds the fluorine-based resin layer 11 and the substrate layer 12, and the substrate layer 12 and the fluorine-based resin layer 11 are laminated with the intermediate layer 10 interposed therebetween. A thickness of the fluorine-based resin layer 11 is 20 μm or more and 50 μm or less. The laminate 1 according to the present embodiment has a three-layer structure of the substrate layer 12, the intermediate layer 10, and the fluorine-based resin layer 11. Since the laminate of a three-layer structure can be manufactured not through complicated steps, and the uniformity in each layer of the laminate is more improved, the laminate of a three-layer structure is preferable.

A water vapor permeability of the laminate of the present embodiment is 0.5 g/m$^2$/24 hours or less, preferably 0.4 g/m$^2$/24 hours or less, and more preferably 0.3 g/m$^2$/24 hours or less.

The laminate of the present embodiment has the water vapor permeability in the above-mentioned specific range, so that for example, when a press-through package for medicines is manufactured, the laminate can exert high barrier properties and can prevent deterioration of the content. In the present embodiment, the water vapor permeability can be controlled by adjusting a material and thickness of respective layers of the substrate layer, the fluorine-based resin layer, and the intermediate layer. In the present embodiment, it is preferable that the water vapor permeability is controlled to the above-mentioned specific numerical value range particularly by adjusting the material and thickness of the fluorine-based resin layer, and inter alia, it is more preferable that the water vapor permeability is controlled by adjusting the thickness of the fluorine-based resin layer.

In the laminate of the present embodiment, an upper yield point stress measured under the following measuring conditions is preferably 1,500 N/cm$^2$ or more, more preferably 2,000 N/cm$^2$ or more, and particularly preferably 2,100 N/cm$^2$ or more.

By adjusting the upper yield point stress of the laminate to the above-mentioned lower limit value or more, moldability at the time of deep draw molding is good. That is, at the time of deep draw molding, a deep drawn part of the laminate has a convex shape, and a part that is extended as compared with the original laminate is generated. However, when the upper yield point stress is the lower limit value or more, a force that the deep drawn part having a convex shape returns to the original shape is lost, and for that reason, the moldability of the laminate becomes good. Accordingly, for example, adaptability to an automatic packaging line can be made good.

An upper limit value of the upper yield point stress is not particularly limited, and an example thereof can be 5,000 N/cm$^2$ or less.

The upper yield point stress can be controlled by adjusting the material and thickness of respective layers of the substrate layer, the fluorine-based resin layer, and the intermediate layer, and in the present embodiment, particularly, it is more preferable that the upper yield point stress is controlled by adjusting the thickness of the substrate layer and the composition of the intermediate layer.

The upper yield point stress is measured under the following measuring conditions.

Measuring apparatus: Autograph 100 A type manufactured by Shimadzu Corporation

Measuring conditions: JIS K-6732 (tension speed: 50 mm/min, test temperature: 25° C.)

Shape and dimension of test piece: Dimension based on JIS K-7127 test piece type Unit: N/cm$^2$, a value measured in accordance with JIS K-6732

Respective layers constituting the laminate of the present invention will be described below.

[Substrate Layer]

In the present embodiment, a material forming the substrate layer 12 is any one or more kinds of a polyolefin-based resin, a polyester-based resin, or a vinyl-based resin.

Examples of the polyolefin-based resin include a polyethylene resin, a polypropylene resin, a polymethylpentene resin, and the like.

Examples of the polyester-based resin include polyethylene terephthalate, polyethylene naphthalate, polyethylene isophthalate, polybutylene terephthalate, and the like.

Examples of the vinyl-based resin include a polyvinyl acetate-based resin, a polyvinyl chloride-based resin, and the like.

In the present embodiment, the polyester-based resin is preferable, and polyethylene terephthalate is more preferable.

In the present embodiment, by using any one or more kinds of the above-mentioned resins for forming the substrate layer 12, the moldability upon molding in drawing becomes good, for example.

In the present embodiment, a thickness of the substrate layer 12 is not particularly limited, and examples of a lower limit value include 50 μm or more, 80 μm or more, and 100 μm or more. Furthermore, examples of an upper limit value include 250 μm or less, 220 μm or less, and 200 μm or less.

The above-mentioned upper limit values and lower limit values can be arbitrarily combined.

[Intermediate Layer]

Intermediate Layer (1)

In the present embodiment, it is preferable to use, as the intermediate layer 10, an intermediate layer containing a polyethylene-based resin and a modified polyethylene-based resin (hereinafter, may be described as "intermediate layer (1)").

Examples of the polyethylene-based resin include linear low-density polyethylene (LLDPE), low-density polyethylene (LDPE), medium-density polyethylene (MDPE), and high-density polyethylene (HDPE), and it is preferable that the polyethylene-based resin is linear low-density polyethylene.

The modified polyethylene-based resin is a polyethylene-based resin modified with unsaturated carboxylic acid or a derivative of the unsaturated carboxylic acid, and has an acid functional group such as a carboxy group or a carboxylic anhydride group in the polyethylene-based resin. In the present embodiment, one obtained by acid-modifying the polyethylene-based resin is preferable.

Examples of the acid-modifying method include graft modification in which a polyethylene-based resin and an acid functional group-containing monomer are melted and kneaded in the presence of a radical polymerization initiator such as an organic peroxide or an aliphatic azo compound.

A polyethylene-based resin material before modification is not limited as long as it contains ethylene as a raw material monomer, and a known polyethylene-based resin is appropriately used. Specifically, examples thereof include ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; ethylene-based copolymer resins such as an ethylene-vinyl acetate copolymer, an ethylene-(meth)acrylic acid copolymer, and an ethylene-(meth)acrylic acid ester copolymer; and the like, in addition to the examples that are mentioned above as the polyethylene-based resin.

The acid functional group-containing monomer is a compound having an ethylenic double bond and a carboxy group or a carboxylic anhydride group in the same molecule, and examples thereof include various unsaturated monocarboxylic acids and dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

These acid functional group-containing monomers may be used alone, or two or more kinds thereof may be used jointly, in components constituting the intermediate layer.

Inter alia, as the acid functional group-containing monomer, an acid functional group-containing monomer having an acid anhydride group is preferable, a carboxylic anhydride group-containing monomer is more preferable, and maleic anhydride is particularly preferable.

When part of the acid functional group-containing monomer used for acid modification is unreacted, in order to prevent reduction in an adhesive force due to the unreacted acid functional group-containing monomer, it is preferable to use one from which the unreacted acid functional group-containing monomer has been removed in advance.

It is preferable that the modified polyethylene-based resin is maleic anhydride-modified polyethylene in the present embodiment.

In the present embodiment, when the total mass of the polyethylene-based resin and the modified polyethylene-based resin is set to 100%, a lower limit value of a proportion of the polyethylene-based resin to the total mass of the polyethylene-based resin and the modified polyethylene-based resin is preferably 10% or more and further preferably 20% or more. Furthermore, an upper limit value of the proportion of the polyethylene-based resin to the total mass of the polyethylene-based resin and the modified polyethylene-based resin is preferably 70% or less and further preferably 60% or less. For example, a mixing ratio of the polyethylene-based resin and the modified polyethylene-based resin can take [polyethylene-based resin]: [modified polyethylene-based resin]=20:80 to 60:40.

In the present embodiment, by using the intermediate layer (1) containing a mixed material of the polyethylene-based resin and the modified polyethylene-based resin, the adhesion between the fluorine-based resin layer and the substrate layer can be improved. For this reason, a laminate that hardly causes interlayer peeling can be provided.

Intermediate Layer (2)

In the present embodiment, it is also preferable to use, as the intermediate layer 10, an intermediate layer containing an acid-modified polyolefin resin, a resin containing an epoxy group, and an elastomer resin (hereinafter, described as "intermediate layer (2)").

Herein, respective components contained in the intermediate layer (2) will be described.

Acid-Modified Polyolefin Resin

An acid-modified polyolefin resin (hereinafter, described as "component (A)") is a polyolefin-based resin modified with unsaturated carboxylic acid or a derivative of the unsaturated carboxylic acid, and has an acid functional group such as a carboxy group or a carboxylic anhydride group in the polyolefin-based resin.

The component (A) is obtained by modification of the polyolefin-based resin with unsaturated carboxylic acid or a derivative of the unsaturated carboxylic acid, copolymerization of an acid functional group-containing monomer and olefins, or the like. Inter alia, as the component (A), one obtained by acid-modifying the polyolefin-based resin is preferable.

Examples of the acid-modifying method include graft modification in which a polyolefin resin and an acid functional group-containing monomer are melted and kneaded in the presence of a radical polymerization initiator such as an organic peroxide or an aliphatic azo compound.

Examples of the above-mentioned polyolefin-based resin include polyethylene, polypropylene, poly-1-butene, polyisobutylene, a random copolymer of propylene and ethylene or α-olefin, a block copolymer of propylene and ethylene or α-olefin, and the like. Inter alia, polypropylene-based resins such as homopolypropylene (propylene homopolymer; hereinafter, may be referred to as "homo PP"), a block copolymer of propylene-ethylene (hereinafter, may be referred as "block PP"), and a random copolymer of propylene-ethylene (hereinafter, may be referred to as "random PP") are preferable, and random PP is particularly preferable.

Examples of the above-mentioned olefins in the case of copolymerization include olefin-based monomers such as ethylene, propylene, 1-butene, isobutylene, 1-hexene, and α-olefin.

The acid functional group-containing monomer is a compound having an ethylenic double bond and a carboxy group or a carboxylic anhydride group in the same molecule, and examples thereof include various unsaturated monocarboxylic acids and dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

These acid functional group-containing monomers may be used alone, or two or more kinds thereof may be used jointly in the component (A).

Inter alia, as the acid functional group-containing monomer, since reactivity with a component (B) described later is high, an acid functional group-containing monomer having an acid anhydride group is preferable, a carboxylic anhydride group-containing monomer is more preferable, and maleic anhydride is particularly preferable.

When a part of the acid functional group-containing monomer used for acid modification is unreacted, in order to prevent reduction in an adhesive force due to the unreacted acid functional group-containing monomer, it is preferable to use, as the component (A), one from which the unreacted acid functional group-containing monomer has been removed in advance. Herein, "unreacted" means that the monomer is not subjected to acid modification.

Inter alia, from the viewpoint that high adhesiveness to the fluorine-based resin layer can be exerted, maleic anhydride-modified polypropylene is preferable as the component (A).

Resin Containing Epoxy Group

In the present embodiment, it is preferable that the resin containing an epoxy group (hereinafter, described as "component (B)") is a component having an epoxy group and a vinyl group. It is preferable that the resin containing an epoxy group has a 1,2-vinyl structure, and epoxidized polybutadiene in which butadiene has been partially epoxidized is more preferable. One in which 1,2-polybutadiene has been partially epoxidized is particularly preferable.

Examples of the resin containing an epoxy group usable in the present embodiment include liquid polybutadiene JP-100 and JP-200 of NIPPON SODA CO., LTD., Adekacizer BF-1000 of ADEKA CORPORATION, and the like.

It is preferable that a number average molecular weight of the resin containing an epoxy group is 500 or more and 4,000 or less.

By adjusting the number average molecular weight of the resin containing an epoxy group to the above-mentioned upper limit value or less, reduction in pressure-sensitive adhesiveness due to becoming the solid state at an ambient temperature is suppressed, and reduction in adhesiveness can be prevented.

A number average molecular weight in the present embodiment is a value in terms of polystyrene, which is measured by gel permeation chromatography (GPC).

It is particularly preferable that, as the resin containing an epoxy group, epoxydized polybutadiene is used.

Elastomer Resin

An elastomer resin (hereinafter, described as "component (C)") should be a component with properties as an elastomer, and examples thereof include a styrene-based elastomer, an acrylic-based elastomer, a urethane-based elastomer, an olefin-based elastomer, an ester-based elastomer, and the like.

Inter alia, the olefin-based elastomer is preferable, and examples thereof include a block copolymer having a hard segment including polystyrene or the like and a soft segment including polyethylene, polybutadiene, polyisoprene or the like. Examples of an olefin-based polymer usable in the olefin-based elastomer include copolymers of aromatic olefin-aliphatic olefin such as a styrene-butadiene copolymer, a styrene-isoprene copolymer, and a styrene-ethylene copolymer.

In the present embodiment, it is preferable that the component (C) is contained in an amount of 1 part by mass or more and 50 parts by mass or less, based on 50 parts by mass or more and 99 parts by mass or less of the component (A). Inter alia, it is more preferable that the component (B) is contained in an amount of 15 parts by mass or more and 35 parts by mass or less, based on 65 parts by mass or more and 85 parts by mass or less of the component (C).

In the present embodiment, a thickness of the intermediate layer 10 is 5 μm or more and 50 μm or less, and preferably 10 μm or more and 30 μm or less.

In the present embodiment, by adjusting the thickness of the intermediate layer 10 to the above-mentioned lower limit value or more, the adhesion can be improved, and interlayer peeling can be prevented. Furthermore, by adjusting the thickness of the intermediate layer to the above-mentioned upper limit value or less, deterioration of moldability due to an increase in film thickness can be prevented.

[Fluorine-Based Resin Layer]

As the fluorine-based resin material used for the fluorine-based resin layer 11, polytetrafluoroethylene (PTFE), a tetrafluoroethylene-perfluoroalkyl vinyl ether copolymer (PFA), a tetrafluoroethylene-hexafluoropropylene copolymer (FEP), tetrafluoroethylene-hexafluoropropylene-perfluoroalkyl vinyl ether (EPA), a tetrafluoroethylene-ethylene copolymer (ETFE), polyvinylidene fluoride (PVDF), polychlorotrifluoroethylene (PCTFE), a chlorotrifluoroethylene-ethylene copolymer (ECTFE), a mixture of one or two or more kinds thereof, and the like can be used, and polychlorotrifluoroethylene (PCTFE) is preferable.

In the present embodiment, a thickness of the fluorine-based resin layer 11 is 20 μm or more and 150 μm or less, preferably 25 μm or more and 100 μm or less, and more preferably 30 μm or more and 50 μm or less.

In the present embodiment, by adjusting the thickness of the fluorine-based resin layer 11 to the above-mentioned lower limit value or more, the water vapor permeability of the laminate can be reduced, and for example, when the laminate is used in a press-through package for medicines, high dampproofness can be exerted, and deterioration of the content due to water vapor can be prevented.

In the present embodiment, by adjusting the thickness of the fluorine-based resin layer 11 to the above-mentioned upper limit value or less, production cost can be reduced.

Second Embodiment

A second embodiment of the laminate of the present invention will be described with reference to FIG. 2.

Figure 2:
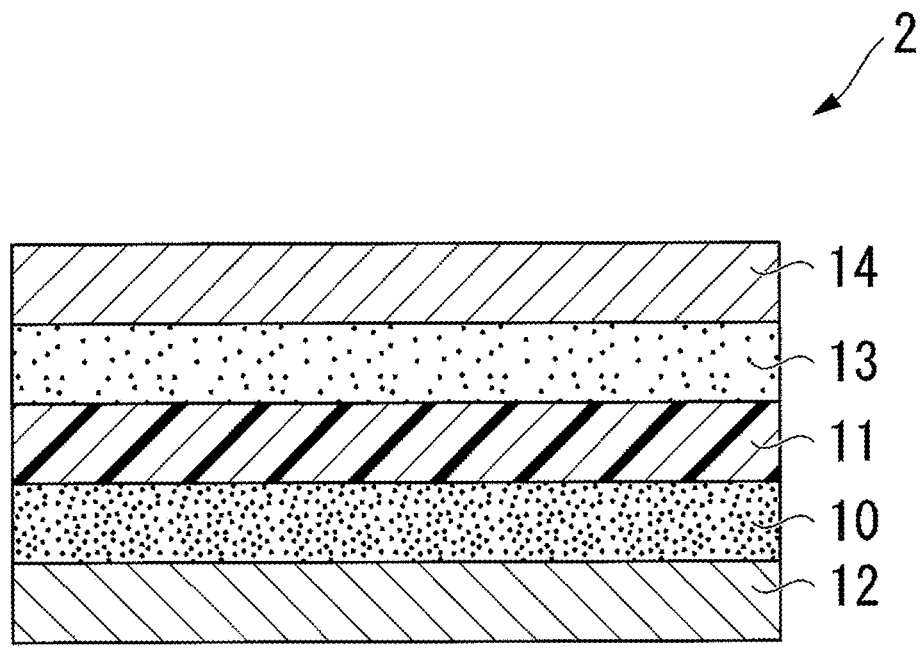
FIG. 2 is a schematic cross-sectional view of a laminate according to a second embodiment of the present invention.

In a laminate 2 of the present embodiment shown in FIG. 2, a substrate layer 12, an intermediate layer 10, a fluorine-based resin layer 11, a second intermediate layer 13, and a second substrate layer 14 are laminated in this order.

Since the strength of the laminate 2 of a five-layer configuration is increased, the laminate 2 is preferable. Furthermore, since curling is hardly generated in the laminate 2 of a five-layer configuration, the laminate 2 is preferable.

Respective materials constituting the substrate layer, the intermediate layer, and the fluorine-based resin layer in the present embodiment are the same as the respective materials described in the above-mentioned first embodiment.

The description concerning materials constituting the second substrate layer 14 is the same as that in the case of the above-mentioned substrate layer 12. The second substrate layer 14 and the substrate layer 12 may have the same material or different materials, and preferably the same material.

The description concerning materials constituting the second intermediate layer 13 is the same as that in the case of the above-mentioned intermediate layer 10. The second intermediate layer 13 and the intermediate layer 10 may have the same material or different materials, and preferably the same material.

Furthermore, a water vapor permeability of the laminate 2 of the present embodiment is 0.5 $g/m^2/24$ hours or less, preferably 0.4 $g/m^2/24$ hours or less, and more preferably 0.3 $g/m^2/24$ hours or less.

The laminate of the present embodiment has the water vapor permeability in the above-mentioned specific range, so that for example, when a press-through package for medicines is manufactured, the laminate can exert high barrier properties and can prevent deterioration of the content.

In the present embodiment, like the above-mentioned first embodiment, the water vapor permeability of the laminate 2 can be controlled by adjusting a material and thickness of respective layers of the substrate layer 12, the intermediate layer 10, the fluorine-based resin layer 11, the second intermediate layer 13, and the second substrate layer 14. In the present embodiment, it is preferable that the water vapor permeability is controlled to the above-mentioned specific numerical value range particularly by adjusting the material and thickness of the fluorine-based resin layer 11, and inter alia, it is more preferable that the water vapor permeability is controlled by adjusting the thickness of the fluorine-based resin layer 11.

In the laminate of the present embodiment, an upper yield point stress measured under the above-mentioned measuring conditions is preferably 1,500 N/cm$^2$ or more, more preferably 2,000 N/cm$^2$ or more, and particularly preferably 2,200 N/cm$^2$ or more.

By adjusting the upper yield point stress of the laminate to the above-mentioned lower limit value or more, the deep draw moldability of the laminate is good. For this reason, for example, adaptability to an automatic packaging line can be made good.

The upper yield point stress can be controlled by adjusting the material and thickness of respective layers of the substrate layer, the fluorine-based resin layer, and the intermediate layer, and in the present embodiment, particularly, it is more preferable that the upper yield point stress is controlled by adjusting the thicknesses of the substrate layer 12 and second substrate layer 14, and the compositions of the intermediate layer 10 and second intermediate layer 13.

In the present embodiment, a material constituting the substrate layer 12 and a material constituting the second substrate layer 14 may be the same or different, and are preferably the same resin materials.

The thickness of the second substrate layer 14 to that of the substrate layer 12 is preferably 0.5 times to 1.1 times, more preferably 0.9 times to 1.1 times, and particularly preferably 0.95 times to 1.05 times.

In the present embodiment, a material constituting the intermediate layer 10 and a material constituting the second intermediate layer 13 may be the same or different, and are preferably the same resin materials.

The thickness of the second intermediate layer 13 to that of the intermediate layer 10 is more preferably 0.9 times to 1.1 times, and particularly preferably 0.95 times to 1.05 times.

In the laminate of the present invention, an upper limit of a total film thickness is 400 μm or less and preferably 300 μm or less. Furthermore, a lower limit of the total film thickness is preferably 80 μm or more, and more preferably 200 μm or more. By setting the total film thickness to the above-mentioned range, the content is easily protected, and also after the laminate is molded, the resulting material is easily stored and used.

<Blister Container, Press-Through Package>

A blister container and press-through package according to the embodiments of the present invention are manufactured by deep drawing the above-mentioned laminate of the first or second embodiment of the present invention.

When the above-mentioned laminate 1 according to the first embodiment of the present invention is used, the fluorine-based resin layer 11 can face an internal side and can also face an external side, and it is preferable that the laminate 1 is molded so that the fluorine-based resin layer 11 faces an external side.

The press-through package according to the embodiments of the present invention is used, for example, in individual packaging for tablets or capsules.

Since the above-mentioned laminate of the present invention has low water vapor permeability, deterioration of the content of tablets, capsules, or the like can be prevented.

It is preferable that the laminate according to the first embodiment is manufactured by simultaneously melting and extrusion-molding a resin that is to be a raw material for the above-mentioned substrate layer, a resin that is to be a raw material for the above-mentioned intermediate layer, and a resin that is to be a raw material for the above-mentioned fluorine-based resin layer.

Furthermore, it is preferable that the laminate according to the second embodiment is manufactured by simultaneously melting and extrusion-molding a resin that is to be a raw material for the above-mentioned substrate layer, a resin that is to be a raw material for the above-mentioned intermediate layer, a resin that is to be a raw material for the above-mentioned fluorine-based resin layer, a resin that is to be a raw material for the above-mentioned second intermediate layer, and a resin that is to be a raw material for the above-mentioned second substrate layer.

EXAMPLES

The present invention will be described in further detail below by way of Examples, but the present invention is not limited by these Examples.

<Laminate of Three-Layer Configuration>

Examples 1 to 5, Comparative Examples 1 and 2

Laminates of a three-layer configuration each having a substrate layer, an intermediate layer, and a fluorine-based resin layer in this order were manufactured. Resins that are to be raw materials for respective layers shown in Table 1, which had each been heated and melted separately, were subjected to multilayer film formation using an extruder that can perform co-extrusion multilayer molding, and laminates of a three-layer configuration having a substrate layer, an intermediate layer, and a fluorine-based resin layer in this order were obtained.

The water vapor permeability of the obtained respective laminates was measured by the following method.

[Measurement of Water Vapor Permeability]

Concerning the laminates obtained according to the above-mentioned <Laminate of Three-Layer Configuration>, a water vapor permeability was measured under conditions of a cell temperature of 40° C. and a relative humidity of 90% RH using a water vapor permeability meter (manufactured by Systech Instruments, product name "L80-5000"), according to JIS K7129: 2008 (Method A). The water vapor permeability is expressed by the gram number of water vapor per area of 1 square meter, which permeated for 24 hours [g/m$^2$/24 h].

TABLE 1

|  | Substrate layer [μm] | Intermediate layer [μm] | Fluorine-based resin layer [μm] | Total film thickness [μm] | Water vapor permeability [g/m$^2$/24 h] |
|---|---|---|---|---|---|
| Example 1 | PET [200] | Intermediate layer 1 [20] | PCTFE [30] | 250 | 0.19 |

TABLE 1-continued

|  | Substrate layer [μm] | Intermediate layer [μm] | Fluorine-based resin layer [μm] | Total film thickness [μm] | Water vapor permeability [g/m²/24 h] |
|---|---|---|---|---|---|
| Example 2 | PET [190] | Intermediate layer 1 [20] | PCTFE [40] | 250 | 0.45 |
| Example 3 | PET [200] | Intermediate layer 2 [20] | PCTFE [30] | 250 | 0.20 |
| Example 4 | PET [200] | Intermediate layer 3 [20] | PCTFE [30] | 250 | 0.20 |
| Example 5 | PET [80] | Intermediate layer 1 [20] | ECTFE [150] | 250 | 0.05 |
| Comparative Example 1 | PET [30] | Intermediate layer 1 [20] | PCTFE [200] | 250 | 0.02 |
| Comparative Example 2 | PET [220] | Intermediate layer 1 [20] | PCTFE [10] | 250 | 0.55 |

In Table 1, respective symbols mean the following materials. A numerical value in parenthesis is the thickness of each layer.

PET: Polyethylene terephthalate resin. NOVAPEXI4 manufactured by Mitsubishi Chemical Corporation is used.

PCTFE: Polychlorotrifluoroethylene resin. DF0050-C1 manufactured by DAIKIN INDUSTRIES, LTD. is used.

ECTFE: Chlorotrifluoroethylene•ethylene copolymer.

Intermediate layers 1 to 3: Intermediate layers 1 to 3 shown in the following Table 2. A ratio of respective materials in Table 2 is a mass ratio (%).

TABLE 2

| Intermediate layer 1 | Linear low-density polyethylene (LLDPE)/ADMER SE (maleic acid-modified polyethylene) = 50/50 |
| Intermediate layer 2 | Polyethylene/elastomer/epoxidized polybutadiene = 70/29/1 |
| Intermediate layer 3 | Linear low-density polyethylene (LLDPE)/ADMER SE (maleic acid-modified polyethylene) = 10/90 |

Assessment

Concerning respective laminates of Examples 1 to 5 and Comparative Examples 1 to 2, the following respective tests were performed.

[Upper Yield Point Stress]

An upper yield point stress was measured under the following measuring conditions:

Measuring apparatus: Autograph 100A type manufactured by Shimadzu Corporation

Measuring conditions: JIS K-6732 (tension speed: 50 mm/min, test temperature: 25° C.)

Shape and dimension of test piece: Dimension based on JIS K-7127 test piece type 5

Unit: N/cm², value measured in accordance with JIS K-6732

[Moldability]

The laminate moldability was accessed based on the following criteria by visually observing the presence or absence of molding defective when a press-through package was formed.

⊙; Thickness deviation of the deep drawn part and shape retention after deep drawing were very good.

○; Thickness deviation of the deep drawn part and shape retention after deep drawing were generally good.

Δ; The deep drawn part was slightly deviated in the thickness, or shape retention after deep drawing was not achieved in some cases.

x; The deep drawn part was deviated in the thickness, or a shape of the deep drawn part was not retained after deep drawing.

[Content Protection Properties]

Using respective laminates of Examples 1 to 5 and Comparative Examples 1 to 2, a press-through package was manufactured, the content (test chemical agent having deliquescence) was placed into the package, and deterioration of the content was visually accessed based on the following criteria. At that time, the press-through package was manufactured so that the fluorine-based resin layer of the laminate faced an external side.

⊙; Deterioration of the content was not seen.

○; Deterioration of the content was hardly seen.

Δ; Deterioration of the content was slightly seen.

x; Remarkable deterioration of the content was confirmed.

[Assessment]

Respective assessment items were comprehensively determined and assessed, and three-stage assessment (⊙, ○, x) was performed.

TABLE 3

|  | Upper yield point stress [N/cm²] | Moldability | Content protection properties | Assessment |
|---|---|---|---|---|
| Example 1 | 2,500 | ○ | ⊙ | ⊙ |
| Example 2 | 2,480 | ○ | ○ | ○ |
| Example 3 | 2,300 | ○ | ○ | ○ |
| Example 4 | 2,100 | ○ | ⊙ | ⊙ |
| Example 5 | 2,400 | ○ | ⊙ | ○ |
| Comparative Example 1 | 2,350 | X | ⊙ | X |
| Comparative Example 2 | 3,040 | ○ | X | X |

As shown in the above-mentioned results, the laminates of Examples 1 to 5, in which the fluorine-based resin layer had a specific thickness and the water vapor permeability of the laminate was in a specific range, and to which the present invention had been applied, had a high upper yield point stress and were good in moldability and protection properties of the content. In contrast, concerning the laminate of Comparative Example 1 in which the thickness of the fluorine-based resin layer was not in the range of the present invention, the moldability was not good. Concerning the laminate of Comparative Example 2 in which the value of the water vapor permeability was not in the range of the present invention, the content protection properties were not good.

<Laminate of Five-Layer Configuration>

Examples 6 to 10, Comparative Examples 3 and 4

Laminates of a five-layer configuration each having a substrate layer, an intermediate layer, a fluorine-based resin layer, a second intermediate layer, and a second substrate layer in this order were manufactured. Resins that were to be raw materials for respective layers shown in Table 4, which had each been heated and melted separately, were subjected to multilayer film formation using an extruder that can perform co-extrusion multilayer molding, and laminates of a five-layer configuration having a substrate layer, an intermediate layer, a fluorine-based resin layer, a second intermediate layer, and a second substrate layer in this order were obtained.

TABLE 5

|  | Upper yield point stress [N/cm²] | Moldability | Content protection properties | Assessment |
|---|---|---|---|---|
| Example 6 | 2,770 | ○ | ⊙ | ⊙ |
| Example 7 | 2,750 | ○ | ⊙ | ⊙ |
| Example 8 | 2,700 | ○ | ○ | ○ |
| Example 9 | 2,650 | ⊙ | ⊙ | ⊙ |
| Example 10 | 2,300 | ○ | ⊙ | ○ |
| Comparative Example 3 | 2,200 | × | ⊙ | × |
| Comparative Example 4 | 2,800 | ○ | × | × |

As shown in the above-mentioned results, the laminates of Examples 6 to 10, in which the fluorine-based resin layer has a specific thickness and the water vapor permeability of the laminate was in a specific range, were high in upper yield point stress and were good in moldability and protection properties of the content. In contrast, concerning the laminate of Comparative Example 3 in which the thickness of the fluorine-based resin layer was not in the range of the present invention and further, the water vapor permeability was also not in the range of the present invention, the moldability was not good. Furthermore, concerning the laminate of Com-

TABLE 4

|  | Substrate layer [μm] | Intermediate layer [μm] | Fluorine-based resin layer [μm] | Second intermediate layer [μm] | Second substrate layer [μm] | Total film thickness [μm] | Water vapor permeability [g/m²/24 h] |
|---|---|---|---|---|---|---|---|
| Example 6 | PET [105] | Intermediate layer 1 [15] | PCTFE [30] | Intermediate layer 1 [15] | PET [105] | 270 | 0.20 |
| Example 7 | PET [110] | Intermediate layer 1 [15] | PCTFE [20] | Intermediate layer 1 [15] | PET [110] | 270 | 0.30 |
| Example 8 | PET [100] | Intermediate layer 2 [20] | PCTFE [20] | Intermediate layer 2 [20] | PET [100] | 260 | 0.30 |
| Example 9 | PET [100] | Intermediate layer 3 [20] | PCTFE [20] | Intermediate layer 3 [20] | PET [100] | 260 | 0.30 |
| Example 10 | PET [45] | Intermediate layer 1 [15] | PCTFE [150] | Intermediate layer 1 [15] | PET [45] | 270 | 0.05 |
| Comparative Example 3 | PET [20] | Intermediate layer 1 [15] | PCTFE [200] | Intermediate layer 1 [15] | PET [20] | 270 | 0.03 |
| Comparative Example 4 | PET [117] | Intermediate layer 1 | PCTFE [5] | Intermediate layer 1 | PET [117] | 269 | 1.20 |

In Table 4, respective symbols mean the following materials. A numerical value in parenthesis is the thickness of each layer.

PET: Polyethylene terephthalate resin. NOVAPEXI4 manufactured by Mitsubishi Chemical Corporation is used.

PCTFE: Polychlorotrifluoroethylene resin. DF0050-C1 manufactured by DAIKIN INDUSTRIES, LTD. is used.

Intermediate layers 1 to 3: Intermediate layers 1 to 3 shown in the above-mentioned Table 2.

[Water Vapor Permeability]

A water vapor permeability was measured by the same method as that described above.

Assessment

Concerning respective laminates of Examples 6 to 10 and Comparative Examples 3 to 4, an upper yield point stress, content protection properties, and moldability were assessed by the same methods as those described above. The results thereof are described in Table 5.

parative Example 4, since the thickness of the fluorine-based resin layer was thin, the content protection properties were defective.

What is claimed is:

1. A laminate comprising a substrate layer, an intermediate layer, and a fluorine-based resin layer in this order, and having a total film thickness of 400 μm or less,
   wherein
   a thickness of said substrate layer is 50 μm or more and 200 μm or less,
   a thickness of said intermediate layer is 5 μm or more and 50 μm or less,
   a thickness of said fluorine-based resin layer is 20 μm or more and 150 μm or less,
   a water vapor permeability of said laminate is 0.5 g/m²/24 hours or less,
   an upper yield point stress of said laminate is 1,500 N/cm² or more,
   said substrate layer comprises a polyester-based resin selected from the group consisting of polyethylene terephthalate, polyethylene isophthalate, and polybutylene terephthalate, said intermediate layer consists of (i) a linear low-density polyethylene and a maleic anhydride-modified polyethylene, or (ii) a maleic anhydride-modified polypropylene, an epoxydized polybutadiene having a number average molecular weight of 500 or more and 4,000 or less, and a copolymer of aromatic olefin-aliphatic olefin, the linear low-density polyethylene is contained in an amount of 10 percent by mass or more and 70 percent by mass or less based on 100 percent by mass of total mass of the linear low-density polyethylene and the maleic anhydride-modified polyethylene, the copolymer of aromatic olefin-aliphatic olefin is contained in an amount of 1 part by mass or more and 50 parts by mass or less based on 50 parts by mass or more and 99 parts by mass or less of the maleic anhydride-modified polypropylene, and the epoxydized polybutadiene is contained in an amount of 15 parts by mass or more and 35 parts by mass or less based on 65 parts by mass or more and 85 parts by mass or less of the copolymer of aromatic olefin-aliphatic olefin, and said intermediate layer functions as an adhesive agent layer that bonds said fluorine-based resin layer and said substrate layer, and said substrate layer and said fluorine-based resin layer are laminated with said intermediate layer interposed therebetween.

2. The laminate according to claim 1, further comprising a second intermediate layer and a second substrate layer in this order on a surface of said fluorine-based resin layer, the surface being opposite to a surface on which said intermediate layer is formed.

3. The laminate according to claim 1, wherein said fluorine-based resin layer contains polychlorotrifluoroethylene.

4. The laminate according to claim 2, wherein said second intermediate layer consists of the linear low-density polyethylene and the maleic anhydride-modified polyethylene, and the linear low-density polyethylene is contained in the amount of 10 percent by mass or more and 70 percent by mass or less based on 100 percent by mass of total mass of the linear low-density polyethylene and the maleic anhydride-modified polyethylene.

5. A blister container comprising the laminate according to claim 1.

6. A press-through package comprising the laminate according to claim 1.

7. A laminate comprising a substrate layer, an intermediate layer, a fluorine-based resin layer, a second intermediate layer, and a second substrate layer in this order, and having a total film thickness of 400 μm or less, wherein a thickness of said substrate layer is 50 μm or more and 200 μm or less, a thickness of said intermediate layer is 5 μm or more and 50 μm or less, a thickness of said fluorine-based resin layer is 20 μm or more and 150 μm or less, a water vapor permeability of said laminate is 0.5 g/m$^2$/24 hours or less, an upper yield point stress of said laminate is 1,500 N/cm$^2$ or more, said substrate layer comprises a polyester-based resin selected from the group consisting of polyethylene terephthalate, polyethylene isophthalate, and polybutylene terephthalate, said intermediate layer consists of (i) a linear low-density polyethylene and a maleic anhydride-modified polyethylene, or (ii) a maleic anhydride-modified polypropylene, an epoxydized polybutadiene having a number average molecular weight of 500 or more and 4,000 or less, and a copolymer of aromatic olefin-aliphatic olefin, the linear low-density polyethylene is contained in an amount of 10 percent by mass or more and 70 percent by mass or less based on 100 percent by mass of total mass of the linear low-density polyethylene and the maleic anhydride-modified polyethylene, the copolymer of aromatic olefin-aliphatic olefin is contained in an amount of 1 part by mass or more and 50 parts by mass or less based on 50 parts by mass or more and 99 parts by mass or less of the maleic anhydride-modified polypropylene, and the epoxydized polybutadiene is contained in an amount of 15 parts by mass or more and 35 parts by mass or less based on 65 parts by mass or more and 85 parts by mass or less of the copolymer of aromatic olefin-aliphatic olefin, said intermediate layer functions as an adhesive agent layer that bonds said fluorine-based resin layer and said substrate layer, and said substrate layer and said fluorine-based resin layer are laminated with said intermediate layer interposed therebetween, said second intermediate layer consists of the maleic anhydride-modified polypropylene, the epoxydized polybutadiene having a number average molecular weight of 500 or more and 4,000 or less, and the copolymer of aromatic olefin-aliphatic olefin, and the copolymer of aromatic olefin-aliphatic olefin is contained in the amount of 1 part by mass or more and 50 parts by mass or less based on 50 parts by mass or more and 99 parts by mass or less of the maleic anhydride-modified polypropylene, and the epoxydized polybutadiene is contained in the amount of 15 parts by mass or more and 35 parts by mass or less based on 65 parts by mass or more and 85 parts by mass or less of the copolymer of aromatic olefin-aliphatic olefin.

* * * * *